United States Patent [19]

Taylor

[11] Patent Number: 4,994,791
[45] Date of Patent: Feb. 19, 1991

[54] PROGRESSIVELY MONITORABLE FIRE ALARM SYSTEM

[75] Inventor: Henry F. Taylor, College Station, Tex.

[73] Assignee: Texas A & M University System, College Station, Tex.

[21] Appl. No.: 286,058

[22] Filed: Dec. 19, 1988

Related U.S. Application Data

[62] Division of Ser. No. 108,270, Oct. 13, 1987, Pat. No. 4,848,999.

[51] Int. Cl.⁵ .............................................. G08B 17/12
[52] U.S. Cl. ..................................... 340/578; 340/584; 356/352; 374/161; 350/96.15
[58] Field of Search ......................... 340/578, 579, 584; 356/352, 356, 358; 374/130, 131, 161; 350/96.15

[56] References Cited

U.S. PATENT DOCUMENTS

| | | | |
|---|---|---|---|
| 4,130,345 | 12/1978 | Doellner | 350/96.22 |
| 4,165,496 | 8/1979 | Di Domenico et al. | 331/94.55 |
| 4,198,630 | 4/1980 | Serinken et al. | 350/784 |
| 4,221,472 | 9/1980 | Smith et al. | 350/356 |
| 4,283,113 | 8/1981 | Eden | 350/96.15 |
| 4,296,995 | 10/1981 | Bickel | 350/96.15 |
| 4,314,740 | 2/1982 | Bickel | 350/96.15 |
| 4,325,605 | 4/1982 | Winzer | 350/96.15 |
| 4,329,058 | 5/1982 | James et al. | 350/352 |
| 4,351,585 | 9/1982 | Winzer et al. | 350/96.15 |
| 4,378,143 | 3/1983 | Winzer | 350/96.15 |
| 4,455,089 | 6/1984 | Yeung et al. | 356/352 |
| 4,475,789 | 10/1984 | Kahn | 350/96.15 |
| 4,505,539 | 3/1985 | Auracher et al. | 350/96.15 |
| 4,549,782 | 10/1985 | Miller | 350/96.16 |
| 4,627,728 | 12/1986 | Willson | 356/352 |
| 4,647,203 | 3/1987 | Jones et al. | 356/352 |
| 4,830,451 | 5/1989 | Stone | 350/96.15 |

OTHER PUBLICATIONS

Miyauchi, E., Compact Wavelength Multiplexer using Optical-Fiber Pieces, Optical Society of America, vol. 5, No. 7, (1980).

Epworth, Model Noise-Causes and Cures, Laser Focus, vol. 17 (1981) pp. 224-230.

Kuwahara, H., A Semi-Transparent Mirror-Type Directional Coupler for Optical Fiber Applications, IEEE Transactions of Microwave Theory & Techniques, pp. 179-180.

Primary Examiner—Joseph A. Orsino
Assistant Examiner—Geoff Sutcliffe
Attorney, Agent, or Firm—Arnold, White & Durkee

[57] ABSTRACT

A method for producing reflectors in a continuous length of optical fiber is disclosed. The present process includes the steps of preparing the ends of two or more optical fibers, placing one or more of these fibers in a vacuum system and applying a metallic or dielectric coating to the fiber ends, and then fusing the prepared, coated ends of the fibers together until the reflectivity of the region reaches a desired value.

5 Claims, 3 Drawing Sheets

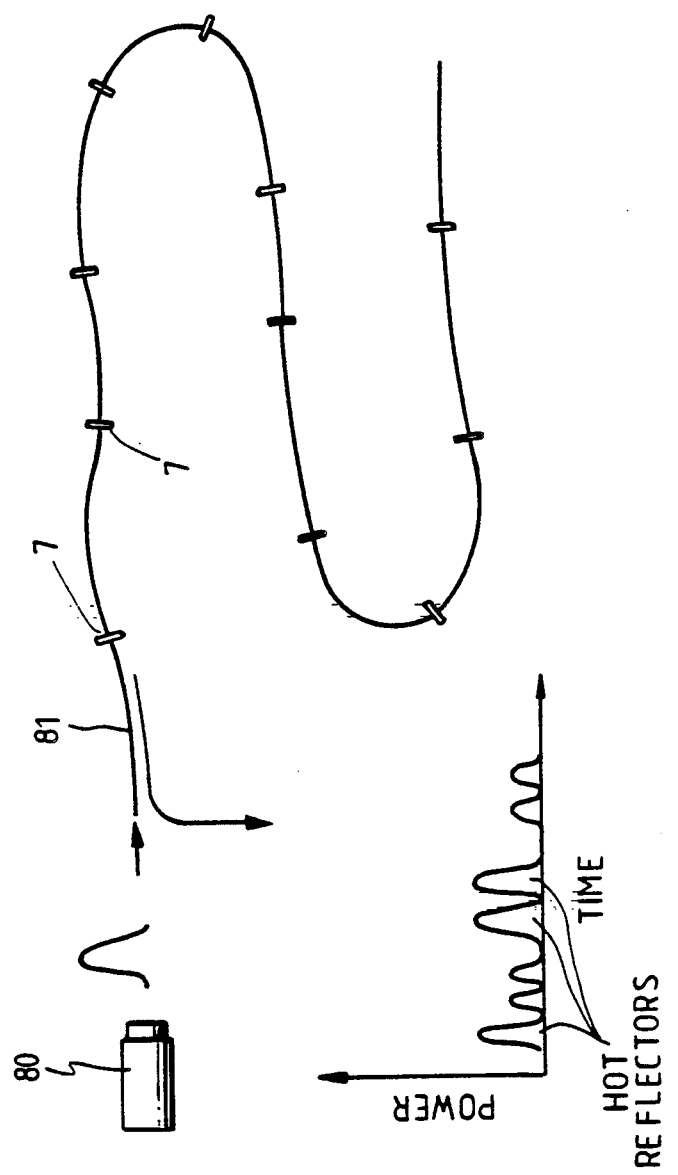
Fig. 7a
Fig. 7b
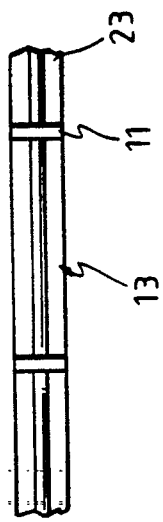
Fig. 6

PROGRESSIVELY MONITORABLE FIRE ALARM SYSTEM

This is a divisional of application Ser. No. 108,270 filed Oct. 13, 1987 now U.S. Pat. No. 4,848,999.

BACKGROUND OF THE INVENTION

1. Field of the Invention

The present invention generally relates to a method for producing reflectors in continuous lengths of optical fiber. More particularly, the present invention involves the fabrication of reflectors in optical fibers by fusion splicing. The present invention also relates to apparatus which make use of fiber reflectors produced as a result of the claimed invention.

2. Description of the Prior Art

A number of methods for fabricating taps in optical fibers have been disclosed in the art. One such method involves the bending of the optical fiber axis in order to couple out some of the light which would ordinarily propagate through the substantially linear fiber. This method is used, for example, in the Siecor Model M67-210 Local Injection Detection System, as a means of monitoring the transmitted power in a fusion splicing unit. The tap produced as a result of this method of removing light is normally referred to as a macrobend tap.

A second method known in the art discloses the use of two fibers having relatively thin cores which are merged or placed in close proximity to each other so that at least some of the propagated light couples from one fiber to another. Such a method is generally disclosed in such commercial applications as the Amphenol Model 945 Fiber Coupler, often referred to as a fiber optic directional coupler.

Yet a third prior art method discloses the use of a reflective film deposited or evaporated on the ends of oblique optical fibers which are then physically combined at a joint or other similar bonding structure. In such prior art applications, a dielectric film, such as $TiO_2$ or $SiO_2$, is alternatively evaporated on the fiber ends in order to reflect part of the light propagated through the fiber. Couplers of this type generally utilize optical fibers cut at an angle of 45° to their respective axis, and utilize optical cement for joining the fiber ends.

These prior art methods, however, suffer from a number of disadvantages. When light is coupled out by bending or distorting the linear axis of the optical fiber, it oftentimes becomes difficult to concentrate the propagated light into a small area photodetector. This disadvantage hinders high speed operation desirous in contemporary signal processing applications. Further, such a method couples light out in only a forward or lateral direction, but not in the reverse direction, as is often required in preferred applications.

Another significant disadvantage of prior art methods based upon macrobend or directional coupler taps is their tendency to introduce "modal noise" into the coupled fiber system. Recognizable as a spurious amplitude modulation at the receiver, modal noise is caused by the highly mode selective nature of the optical taps normally created between spliced fiber ends.

Other disadvantages of prior art methods include the general lack of structural integrity associated with the cementing of optical fibers coated with dielectric films. For practical applications for this kind of coupler, therefore, mechanical support is generally needed, which support greatly increases the overall bulk and expense of the final system.

SUMMARY OF THE INVENTION

The present invention overcomes the aforementioned and other disadvantages by providing an inexpensive method for producing reflectors in continuous lengths of optical fiber.

In a preferred embodiment of the present invention, optical fibers are first prepared by cleaving or polishing their ends so as to establish a flat, smooth bonding surface. After taking necessary precautions to remove organic films or other contaminants, a selected portion of these fibers are placed in a vacuum system and the prepared ends are then coated with a metallic material such as Ti or a dielectric material such as $TiO_2$. This coating can be prepared by using thermal evaporation, electron beam evaporation, or sputtering. After this coating has been applied to the selected fibers, the prepared, coated fibers are removed from the vacuum system and prepared for splicing. A reflector is then created in a prepared, coated fiber by placing one of these coated fibers end-to-end with an uncoated prepared fiber in a fusing splicing apparatus. One or more arc discharges are then produced by activating the fusion splicing apparatus until the fiber ends are joined together and the reflectivity of the spliced region reaches a desired value.

Using a general aspect of the above described method, variably reflective optical taps may be produced by utilizing the dielectric to metal phase transitions of vanadium oxides which have been incorporated in reflectors formed in a length of optical fiber. By passing electric current through a resistive wire or film formed along a length of fiber containing the reflector, the reflector is heated sufficiently to drive the selected vanadium oxide coating through this phase transition, thus altering the overall reflectivity of the fiber mirror. When the current is turned off or reduced, the optical reflector fiber cools sufficiently to bring it back through the phase transition to its original reflectivity.

Variably reflective optical taps may also be formed utilizing Fabry-Perot cavities arranged along a length of optical fiber. The Fabry-Perot cavities themselves are formed using much of the methodology described earlier for the formation of optical taps. An electrically resistive medium is then deposited along the fiber segment between the optical reflectors such that the introduction of an electric current through the medium brings about a calculated change in reflectivity.

Optical fiber taps produced as a result of the aforedescribed method have a variety of applications. One of the primary applications for these fiber reflectors are as taps in tapped delay line filters, or transversal filters. The use of variable reflectors in such taps also serves to make the tap weight programmable. Also, and similar to other types of transversal filters, these optical taps can function as matched filters, correlators, waveform or sequence generators, and deconvolvers.

Using the aforedescribed methods, optical fibers can be prepared with the surface normal to the axis or with the surface at an angle. When the angle between the surface and the axis is 45°, for example, the light will be reflected out of the film in a direction approximately normal to its axis. A fiber with this sort of surface to axis configuration could be used as a tapping element in fiber communication systems or in a fiber sensor, thus providing an alternative to a directional coupler.

variable reflectivity optical tap incorporating a vanadium oxide may have significant utility in applications where it is necessary to determine and quantify a fluctuation in system temperature. One such example is a thermal sensor such as may be utilized in a progressively monitorable fire alarm system. In optical taps incorporating vanadium oxides, a dramatic change in reflectance will occur near the semiconductor-to-metal phase transition temperature. With such optical tap systems placed at desired locations along a continuous fiber line in a building or naval vessel, for example, the progression of a fire may be monitored via a pulsed light source. Since silica fibers can withstand very high temperatures, this type of system should continue to function properly even when a part of the fiber cable is engulfed in flames.

Fabry-Perot interferometers consisting of single mode fibers with optical mirrors disposed at their ends have been used in the art as interferometric sensors and as discriminators for coherent communication systems. Using the method of the present invention, Fabry-Perot interferometers may be incorporated into a continuous length of optical fiber. In this fashion also, low-finesse Fabry-Perots, monitored in reflection, may be used as temperature sensors.

The taps produced as a result of the present invention are strongly polarization-selective. This polarization selectivity may be utilized in single mode systems, such as in fiber gyroscopes, which necessitate polarizing elements. In such applications, the mirrors produced in the taps would be oriented at Brewsters angle so that all of the light polarized in a first plane is transmitted through the mirror, while light polarized in a second plane is partially reflected. Thus, a highly polarized, transmitted beam may be obtained using multilayer quarter wave coatings.

It is appreciated in the art that reflection from external cavities can lead to mode stabilization and line narrowing in diode lasers. The mirrors produced as a result of the present invention, in conjunction with pigtailed lasers, are ideal for this application. For modelocking applications, an array of mirrors may be utilized. In such a case, the round trip delay phase between the mirrors could equal the spacing of the mode locked pulses and would approximate the inverse of the laser relaxation frequency.

The present invention has many advantages over the prior art. One chief advantage is the ability to produce reflectors simply and inexpensively in continuous lengths of optical fiber. In signal processing applications, this would allow the fabrication of transversal filters for operation with very high bandwidth analog (e.g. >1 GHz)) or high data rate (e.g. >1 G bit/sec) digital signals.

Another advantage of the present invention is the overall mechanical strength of the resultant tap. Using the method of the claimed invention, the strength of the fiber material may be maintained at the tap site so that no mechanical support is needed, thus enhancing the flexibility of the junction while decreasing the overall bulk of the system.

Another advantage of the present invention is the ability to fabricate an optical tap that can be made to reflect light out of the side of a fiber, or to reflect it back down the fiber axis.

Yet another advantage of the claimed method is that the reflectance of the resultant tap can be adjusted to a desired value at the time the tap is being produced.

Yet another advantage of the present invention is the simple, efficient removal of light from a multi-mode fiber so as to substantially reduce modal noise. The method of the present invention results in an optical tap having uniform reflectance across the fiber cross-section. With such uniform reflectance, modal noise produced by the coupler itself is much lower than for directional coupler taps in multi-mode systems.

BRIEF DESCRIPTION OF THE DRAWINGS

FIG. 6 illustrates an interferometer incorporated in a continuous length of optical fiber.

FIGS. 7A-B schematically illustrate a series of variably reflective optical taps as they may be distributed along a continuous length of optical fiber such as to form a progressively monitorable fire alarm system.

DESCRIPTION OF THE PREFERRED EMBODIMENT

Figure 1A:
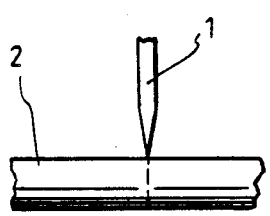
FIGS. 1A-E generally illustrate the basic process of the present invention by which a reflector may be formed in a continuous length of optical fiber.
Figure 1B:
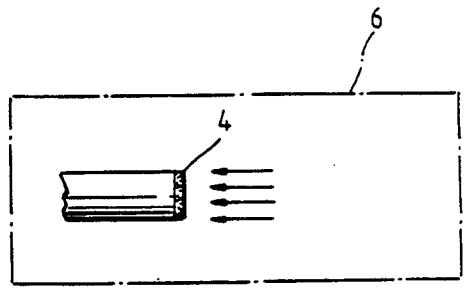
Figure 1C:
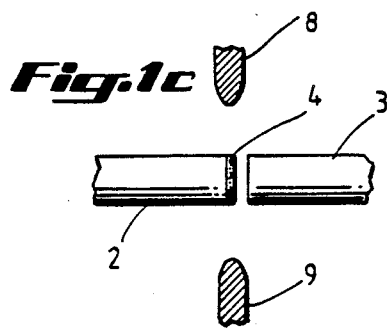
Figure 1D:
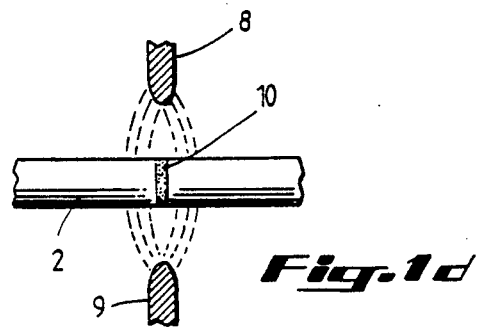
Figure 1E:

FIG. 1 generally illustrates one embodiment of the present invention in which reflectors may be formed in a continuous length of optical fiber. In one preferred embodiment, reflectors may be formed by the fusion splicing of two graded index multimode fibers, one of which is coated on the end with a $TiO_2$ layer or film. Other preferred embodiments make use of a single mode fiber, and may incorporate a variety of coating materials.

Referring to FIGS. 1A-1E, an optical fiber 2 is first prepared by cleaving and/or polishing the ends of the fiber 2 with a scribing tool 1 or the like such that the ends are flat and smooth. After taking any necessary precautions to remove organic films or other contaminants, this fiber 2 is placed in a dc planar magnetron system 6 where a $TiO_2$ film 4 is deposited on the ends by sputtering in a 70% argon-30% oxygen produced atmosphere.

The prepared, coated fiber 2 is then removed from the vacuum system 6 where it is placed end-to-end with an uncoated prepared fiber 3 in a splicing unit which uses an electric arc between electrodes 8 and 9. This splicing unit, e.g. a Siecor Model M-67 fusion splicer, is operated at a much lower arc current and arc duration (typically, 5 mA and 0.3 s) than the recommended value of 14 mA and 1.5 s for splicing uncoated fibers. A number of splicing pulses in sequence are used to produce each reflector 10.

It is envisioned that many other reflectively dissimilar materials might be deposited on the prepared fiber for use in making optical reflectors. Such materials include Zn, ZnO, Ta, Al, Al$_2$O$_3$, Ag, Au, V, VO$_2$, and V$_2$O$_5$. Additionally, these materials may be deposited using alternate methods of thermal evaporation or electron beam evaporation.

Figure 2:
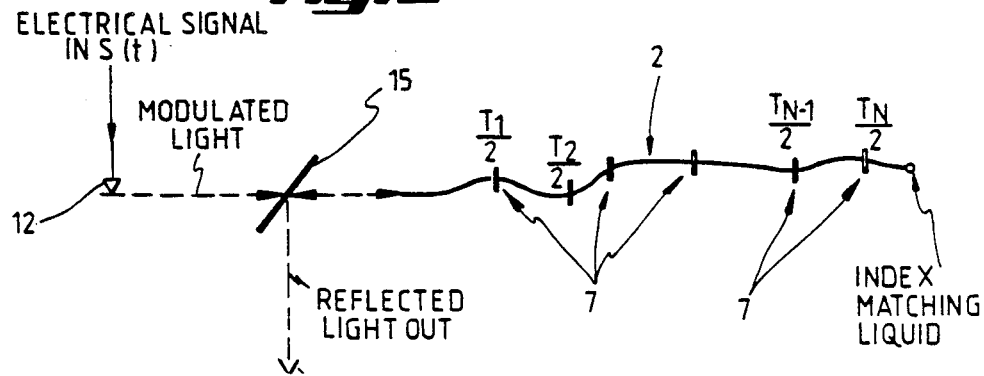
FIG. 2 schematically illustrates an optical time domain reflectometer (OTDR). The configuration illustrated in FIG. 2 also finds application as a tapped-delay-line signal processing device.

The duration, current, and number of discharges are parameters of the process which can be varied to obtain optimum fiber strength and splice reflectivity. If desired, the reflectivity of the splice can be monitored during the fabrication process using an optical time domain reflectometer (OTDR) as illustrated in FIG. 2. In such a setup, short pulses at 0.83 μm from a diode laser 12 are injected into an optical fiber 2, which has been provided with a series of dielectric mirrors 7. The optical pulses reflected from a beam splitter 15, are then monitored with a silicon avalanche photodiode 14. It should be understood that other laser wavelengths, such as 1.3 μm, and other photodetector types, such as germanium avalanche photodiodes, may be used. It should be further appreciated that a fiber optic directional coupler could be used as a beam splitter.

Figure 3A:
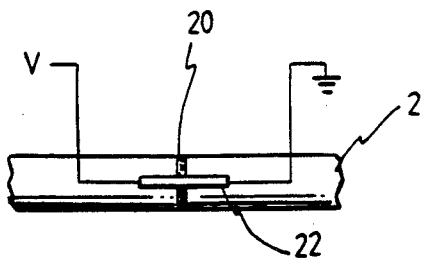
FIGS. 3A-C generally illustrate various methods for producing variably reflective optical taps in a continuous length of optical fiber.
Figure 3B:
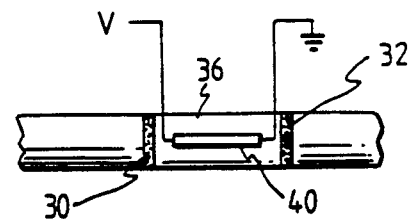
Figure 3C:
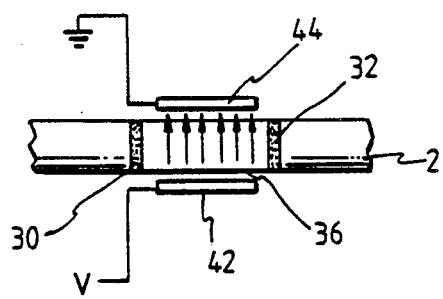

FIGS. 3A-3C illustrate two distinct methods for forming variably reflective taps in a continuous length of optical fiber. As noted, some vanadium oxides undergo a thermally induced dielectric to metal transition, thereby enabling the construction of variably reflective mirrors. FIG. 3A illustrates a variable VO$_2$ or V$_2$O$_5$ reflector 20 formed in a length of optical fiber 2. Placed across this reflector 20 is a resistive film or wire 22 which is formed in contact with the fiber 2. When an electrical current is placed through this resistive film or wire 22, the fiber 2 is heated sufficiently to drive the reflector 20 through its phase transition and thus alter its overall reflectivity. When the current is turned off or reduced, the reflector 20 cools sufficiently to return through the phase transition to its original reflectivity.

In an alternate embodiment of the present invention, a variable reflectivity optical tap may be produced by the fusing of a fiber segment between two fiber optic reflectors of nominally equal reflectivity, this fiber segment being disposed between the two mirrored segments such as to form a Fabry-Perot cavity. These segments may be prepared, coated and fused together according to the methodology previously described.

By changing the optical path length of this cavity, it is possible to adjust the reflectivity in a range between a minimum value near zero and a maximum value approximately 4 times the reflectivity of one of the mirrors in the absence of such a cavity. This optical path length $\Delta L_{opt}$ may be changed by heating the fiber, where the change in optical path length $\Delta L_{opt}$ is then determined by the relationship $\Delta L_{opt}=2\Delta(nL)$, where n is the reflective index, and L is the length of the fiber. This optical path length may also be changed by applying an electric field across the fiber in order to change its refractive index. This change in path length is dictated by the Kerr effect and may be expressed by $\Delta L_{opt}=KE^2$, where E is the applied electric field and K is a constant which depends on the fiber dimensions, and upon the Kerr constant of the fiber material.

FIGS. 3B and 3C generally illustrate a second method of producing variable reflective optical taps employing the aforedescribed method. As seen in FIG. 3b, two reflectors 30 and 32 of nominally equal reflectivity are separated by a segment of fiber 36 in order to form a Fabry-Perot cavity. Across this cavity is placed a resistive film or wire 40 which is in contact with the film segment 36. The optical path length of this cavity may be charged by heating the fiber 36 such as to change its refractive index. Alternatively, and as seen in FIG. 3c, an electron field may be created by applying a voltage between electrodes 41 and 42 across the segment 36 to induce a refractive index change. Using this Fabry-Perot cavity, it is possible to adjust the reflectivity of the resultant optical splice in a range between a minimum value near zero and a maximum value approximately four times the reflectivity of one of the reflectors in the absence of such a cavity.

Figure 4A:
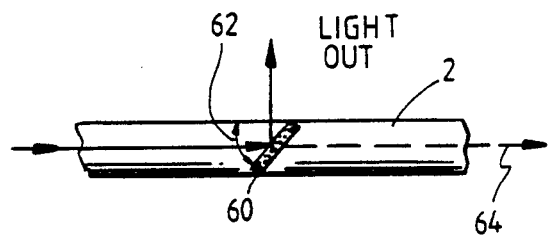
FIGS. 4A-B generally illustrate optical fibers prepared with reflectors positioned at angles relative to the fiber axis.
Figure 4B:
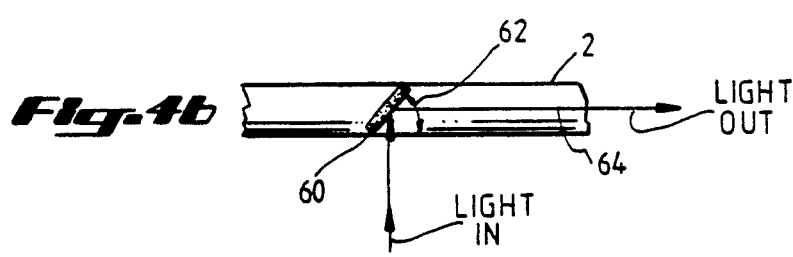

The fabrication of reflectors oriented at an angle to the fiber axis may be seen in FIGS. 4a and 4b. These reflectors are produced by depositing several films of a high and low refractive index on the fiber ends prior to splicing. In these figures, a multilayer mirror 60 is created in an optical fiber 2, said mirror 60 prepared with its reflective surface at an angle 62 to the fiber axis 64.

Figure 5:
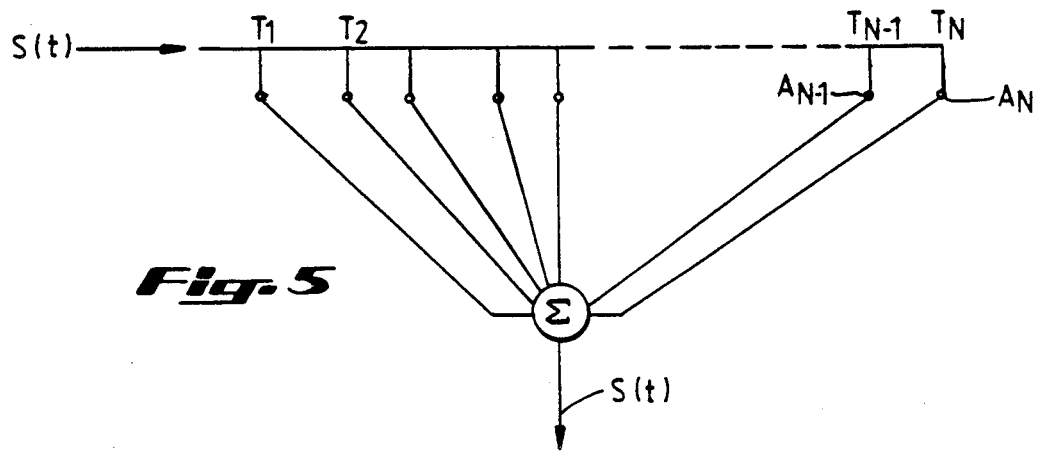
FIG. 5 schematically illustrates a general embodiment of a transversal filter which can be implemented in fiber optic form using the configuration of FIG. 2.

FIG. 5 schematically illustrates a general embodiment of a transversal filter which can be implemented in fiber optic form using the general configuration of FIG. 2.

Referring to FIG. 6, Fabry-Perot interferometers 13 consisting of single mode fibers 3 with mirrors 11 disposed at the ends, have use as interferometric sensors, and as discriminators for coherent communication systems. Using the aforedescribed method, an interferometer 13 may be incorporated in a continuous length of optical fiber 3 as illustrated in FIG. 6. In yet other embodiments, low-finesse Fabry-Perots, monitored in reflection, may be used as temperature sensors such as that illustrated in FIG. 7.

FIG. 7 illustrates yet another embodiment of the present invention in which variably reflective optical taps are distributed along a continuous length of optical fiber. It has been established that the fractional charge in the refractive index of SiO$_2$ fiber is approximately $10^{-5}/°C$. Therefore the reflectance of a Fabry-Perot cavity 10 cm goes through one complete cycle over a 6.5° temperature change at 1.3 μm. If a pulsed light source 80 is coupled to the fiber-tap system and linked by a fiber optic coupler 81 to a receiver (not shown), a progressively monitorable fire alarm system may be formed. In such a system, reflectors 9 undergoing a temperature transition may be identified by their higher power signatures as illustrated in FIG. 7B.

Yet another form of such a temperature sensor would make use of a phase transition material such as VO$_2$ to form the reflectors 9. A reflective change for a particular reflector would occur when it is heated above the transition temperature, which in the case of VO$_2$, is 68° C.

What is claimed is:

1. A progressively monitorable fire alarm system, comprising:
   one or more thermally switchable fiber reflectors disposed along a continuous length of optical fiber, said reflectors being comprised of two optical fiber ends fused together, one of said fiber end having a reflective surface consisting of a vanadium oxide, the combination optical fiber and reflector having a thermally sensitive or an electrically resistive medium deposited along its length;
   a pulsed light source disposed at one end of the optical fiber, and a receiver disposed to detect reflections of the pulsed light source such that a change in the general refractive index of each reflector may be individually monitored.

2. A progressively monitorable fire alarm system, comprising:
multiple low finesse Fabry-Perot cavities disposed in a continuous length of optical fiber, said cavity having a thermally sensitive or an electrically resistive medium deposited along the length of the cavity;
a pulsed light source disposed at one end of the optical fiber, and a receiver disposed to detect reflections of the pulsed light source, such that the change in the general refractive index of each cavity may be monitored.

3. A progressively monitorable fire alarm system comprising:
multiple low finesse Fabry-Perot cavities positioned in a continuous length of optical fiber such that the general reflectivity of the cavity will vary dependent upon temperature;
a pulse light source disposed at one end of the optical fiber, and an optical receiver disposed to detect reflections of the pulsed light source such that the general reflectivity of each cavity may be monitored.

4. The fire alarm system of claim 2 where the Fabry-Perot cavities are constructed by forming two optical mirrors along a continuous length of optical fiber such that the mirrors are separated by a length of optical fiber.

5. The fire alarm system of claim 4 where the mirrors are formed by fusion splicing.

* * * * *

UNITED STATES PATENT AND TRADEMARK OFFICE
CERTIFICATE OF CORRECTION

PATENT NO. : 4,994,791

DATED : February 19, 1991

INVENTOR(S) : Taylor

It is certified that error appears in the above-identified patent and that said Letters Patent is hereby corrected as shown below:

Col. 6, line 59, Claim 1, between the words "fiber" and "having" please delete the word "end" and insert --ends--.

Signed and Sealed this

Seventeenth Day of November, 1992

Attest:

DOUGLAS B. COMER

*Attesting Officer*  *Acting Commissioner of Patents and Trademarks*